United States Patent
Brown et al.

(10) Patent No.: US 9,455,832 B2
(45) Date of Patent: Sep. 27, 2016

(54) SIGNATURES WITH CONFIDENTIAL MESSAGE RECOVERY

(75) Inventors: Daniel R. Brown, Mississauga (CA); Matthew J. Campagna, Ridgefield, CT (US); Marinus Struik, Toronto (CA); Scott A. Vanstone, Campbellville (CA)

(73) Assignee: Certicom Corp., Mississauga, Ontario (CA)

( * ) Notice: Subject to any disclaimer, the term of this patent is extended or adjusted under 35 U.S.C. 154(b) by 1313 days.

(21) Appl. No.: 12/230,799

(22) Filed: Sep. 4, 2008

(65) Prior Publication Data

US 2009/0100267 A1    Apr. 16, 2009

Related U.S. Application Data

(60) Provisional application No. 60/935,855, filed on Sep. 4, 2007.

(51) Int. Cl.
*H04L 9/30* (2006.01)
*H04L 9/32* (2006.01)

(52) U.S. Cl.
CPC .......... *H04L 9/3066* (2013.01); *H04L 9/3242* (2013.01); *H04L 9/3252* (2013.01)

(58) Field of Classification Search
CPC .. H04L 9/3066; H04L 9/3242; H04L 9/3252
USPC ........ 713/180–181, 175–177, 150, 155, 156, 713/164, 165, 168, 170, 171; 380/258, 255, 380/28, 30; 726/2, 26–30; 705/50–51; 707/687, 697–699
See application file for complete search history.

(56) References Cited

U.S. PATENT DOCUMENTS 5,297,206 A * 3/1994 Orton .............................. 380/30
5,600,725 A * 2/1997 Rueppel et al. ................ 380/30

(Continued)

FOREIGN PATENT DOCUMENTS

| EP | 1 083 700 A2 * | 3/2001 | ............... H04L 9/32 |
| WO | 01/10078 A1 | 2/2001 | |
| WO | 2005062919 A2 | 7/2005 | |

OTHER PUBLICATIONS

Chakrabarti, Saikat, et al. "Efficient blind signatures for accountability." Secure Network Protocols, 2007. NPSec 2007. 3rd IEEE Workshop on. IEEE, 2007. (pp. 1-6).*

(Continued)

*Primary Examiner* — Kari Schmidt
(74) *Attorney, Agent, or Firm* — Thomas Grzesik; Fleit Gibbons Gutman Bongini & Bianco P.L.

(57) ABSTRACT

A portion of the signed message in an ECPVS is kept truly confidential by dividing the message being signed into at least three parts, wherein one portion is visible, another portion is recoverable by any entity and carries the necessary redundancy for verification, and at least one additional portion is kept confidential. The additional portion is kept confidential by encrypting such portion using a key generated from information specific to that verifying entity. In this way, any entity with access to the signer's public key can verify the signature by checking for a specific characteristic, such as a certain amount of redundancy in the one recovered portion, but cannot recover the confidential portion, only the specific entity can do so. Message recovery is also provided in an elliptic curve signature using a modification of the well analyzed ECDSA signing equation instead of, e.g. the Schnorr equation used in traditional PV signature schemes.

42 Claims, 12 Drawing Sheets

(56) References Cited

U.S. PATENT DOCUMENTS

| | | | |
|---|---|---|---|
| 5,915,024 A * | 6/1999 | Kitaori et al. | 713/176 |
| 7,249,259 B1 | 7/2007 | Vanstone et al. | |
| 7,346,769 B2 * | 3/2008 | Forlenza et al. | 713/151 |
| 7,480,795 B2 * | 1/2009 | Vanstone | 713/156 |
| 7,860,243 B2 * | 12/2010 | Zheng et al. | 380/30 |
| 7,877,610 B2 * | 1/2011 | Vanstone et al. | 713/180 |
| 2001/0046291 A1 * | 11/2001 | Vanstone et al. | 380/28 |
| 2002/0191797 A1 * | 12/2002 | Perlman | H04L 9/088 380/281 |
| 2005/0135606 A1 * | 6/2005 | Brown | 380/28 |
| 2005/0220300 A1 * | 10/2005 | Lipson | 380/30 |
| 2007/0064932 A1 | 3/2007 | Struik et al. | |
| 2007/0258584 A1 * | 11/2007 | Brown et al. | 380/43 |
| 2008/0016341 A1 * | 1/2008 | Staddon et al. | 713/165 |
| 2011/0194694 A1 * | 8/2011 | Struik | 380/255 |

OTHER PUBLICATIONS

Burmester, Mike, and Judie Mulholland. "The advent of trusted computing: implications for digital forensics." Proceedings of the 2006 ACM symposium on Applied computing. ACM, 2006. (pp. 283-287).*

Barker, Elaine B., Don Johnson, and Miles E. Smid. "SP 800-56A. recommendation for pair-wise key establishment schemes using discrete logarithm cryptography (revised)." (2007).*

Ziade, Francois; International Search Report from corresponding PCT Application No. PCT/CA2008/001541; completed Dec. 22, 2008, received by applicant Jan. 19, 2009.

Shao, Z.; "Improvement of digital signature with message recovery and its variants based on elliptic curve discrete logarithm problem"; Computer Standards and Interfaces; Nov. 1, 2004; pp. 61 to 69; vol. 27, No. 1; Elsevier; ISSN: 0920-5489.

Chang, Y-F. et al.; "Digital signature with message recovery using self-certified public keys without trustworthy system authority"; Applied Mathematics and Computation; Feb. 4, 2005; pp. 211 to 227; vol. 161, No. 1; Elsevier; ISSN: 0096-3003.

Pintsov, L. et al.; "Postal Revenue Collection in the Digital Age"; Financial Cryptography 2000; Jan. 1, 2000; pp. 105 to 120; Springer-Verlag.

Miyaji, A.; "A Message Recovery Signature Scheme Equivalent to DSA over Elliptic Curves"; Nov. 6, 1996; pp. 1 to 14; LNCS; Springer; ISSN: 0302-9743.

Manet, Pascal; Supplementary Search Report from corresponding European Application No. 08800255.5; search completed Oct. 27, 2011.

Extended European Search report mailed Oct. 27, 2011. In corresponding application No. 08800255.

Office Action mailed Feb. 17, 2014; in corresponding Canadian patent application No. 2,698,000.

* cited by examiner

SIGNATURES WITH CONFIDENTIAL MESSAGE RECOVERY

This application claims priority from U.S. Application No. 60/935,855 filed on Sep. 4, 2007, the contents of which are incorporated herein by reference.

TECHNICAL FIELD

The invention relates generally to cryptographic signatures and has particular utility in providing message recovery in such signatures.

BACKGROUND

In a public key cryptographic scheme, a public/private key pair is selected so that the problem of deriving the private key from the corresponding public key is equivalent to solving a computational problem that is believed to be intractable. One commonly used public key scheme is based on integer factorization in finite groups, in particular the RSA public key system for modulus $n=p \cdot q$, where p and q are primes.

Other public key schemes are based on the discrete logarithm problem in finite groups, in particular Diffie-Hellman key exchange and the ElGamal protocol in $Z_p$ (p being a prime), and their variants such as the digital signature algorithm (DSA).

Elliptic curve public key schemes are based on the elliptic curve (EC) discrete logarithm problem, whose hardness is the basis for the security of EC cryptographic (ECC) schemes, including the EC digital signature algorithm (ECDSA). ECC is typically defined over two types of fields, $F_p$ and $F_{2^m}$, or generally $F_q$, where the distinction is not important.

ECC public key schemes are often chosen for being particularly efficient and secure. For instance, it has been demonstrated that smaller parameters can be used in ECC than RSA or other discrete log systems at a given security level. As such, many solutions using ECC have been developed.

The Elliptic Curve Pintsov-Vanstone Signature (ECPVS) scheme, as presented in the ASC X9.92 Draft, provides a digital signature scheme with partial message recovery. PV signatures can be done in other discrete log implementations, however EC is considered most desirable. The ECPVS scheme has been used to provide a level of confidentiality by enabling a portion of the message being signed to be "hidden" within one of the resultant signature components. However, in order for the hidden portion to remain confidential, the public key of the signer needs to be kept secret. In a closed system, this may be convenient, however, keeping the public key secret is not the norm for public key systems.

The ECPVS scheme starts with a signer A having a private/public key pair $(d_A, G_A)$ on an elliptic curve, where $d_A$ is a long term private key and $G_A$ is a restricted public key that is shared amongst a select group of verifiers. In the signing algorithm, A signs a message $M=N\|V$, where N is the hidden portion of the message to be signed. The hidden portion has a predefined characteristic (such as a particular format), e.g. by containing a certain level of redundancy, and V is the plain text portion of the message. In ECPVS, the amount of redundancy or other characteristic can be chosen and thus upon recovering the hidden portion N when verifying the signature, the redundancy or other characteristic can be checked to verify the signature. The following summarizes ECPV signature generation.

1. Generate an ephemeral key pair (k, Q), where $Q=kG$ is a point on the elliptic curve, and k is a random integer $1 \le k < n$, and n is the order of the group generated by the elliptic curve base point G.
2. Construct a key $k_1 = KDF(Q)$, where KDF is a key derivation function. In general, a key derivation function is used to derive a secret key from a secret value and/or some known information. In ECPVS, KDF takes as an input a point, Q, and possibly other information, and generates an encryption key $k_1$.
3. Compute a first signature component c as $c = ENC_{k_1}(N)$, i.e. the encryption of the message N using a key $k_1$, where ENC is a suitable encryption scheme that takes as an input plaintext (e.g. N) and encrypts it with a key $k_1$ to produce ciphertext c.
4. Compute an intermediate component hi as $h = Hash(c\|V)$, where Hash is a suitable hash function, e.g. SHA1. If preferred, additional information that may be available or become available to parties verifying the signature (in other words information that the verifier needs 'on the side' for verification), e.g. a certificate or identifying information of the signer may be incorporated into h.
5. Convert the intermediate component h to an integer e.
6. Calculate a second signature component s using a suitable signature algorithm, such as the Schnorr algorithm, where: $s = e \cdot d_A + k \mod n$.
7. Output the signature as (c, s, V) or (s, c\|V).

The following illustrates ECPV signature verification on a signature (s, c\|V), when provided with A's genuine public key $G_A$.

1. Compute the intermediate component h, using the component c\|V and using the same hash function used in the signing stage and any additional information, such as the identification information of the signer, where: $h = Hash(c\|V)$.
2. Convert h to an integer e.
3. Compute a representation Q' of the ephemeral public key Q using the integer e, the public key of A, the base point G, and the signature component s, e.g. as $Q' = sG - eG_A$.
4. Compute a decryption key $k_1'$ using the same key derivation function KDF used in the signing stage, including the same additional information, namely as $k_1' = KDF(Q')$.
5. Recover a representation N' of the hidden portion N by decrypting the component c using the key derived in step 4 and a complementary decryption function DEC, namely as $N' = DEC_{k_1'}(c)$.
6. Check the specified characteristic (such as a particular format) of, e.g., redundancy contained in N'. If N' contains the necessary characteristic such as a certain amount of redundancy, then N' is a valid message and the signature is verified. If N' does not contain the necessary redundancy, then a null and invalid signature is returned.

The above scheme has been used to hide messages in the signature, in environments where it is reasonable to keep the public key $G_A$ of A secret among a population of verifiers. This requires that the verifiers be trusted and/or controlled such that only they are able to use the public key and thus recover the portion N that is hidden in c. While in certain closed systems this may be plausible for providing confidentiality for the hidden portion to a group in the closed system, it is typically undesirable to have the public key be 'secret'. There is therefore a need to provide true confidentiality in such a system without having to make the public key secret.

SUMMARY OF THE INVENTION

In one aspect, there is provided a method for generating a signature on a message, the method comprising: dividing a message into a plurality of portions, a first portion of the message to be visible, a second portion of the message to be hidden and confidential such that only a specified entity can recover the second portion of the message; encrypting the second portion of the message using a first encryption key to generate a first signature component, the first encryption key being generated using information specific to the specified entity; generating a second signature component using the first signature component, the first portion of the message and a private key; and preparing the signature comprising the first and second signature components and the first portion of the message.

In another aspect, there is provided a method of verifying a signature on a message is provided, the message comprising a plurality of portions, a first portion of the message being visible, a second portion of the message hidden and confidential such that only a specified entity can recover the second portion of the message, the method comprising: obtaining the signature having a first signature component encrypting the second portion of the message using a first encryption key, the first encryption key having been generated using information specific to the specified entity, having a second signature component generated using the first signature component, the first portion of the message and a private key, and having the first portion of the message; if the specified entity, generating a first decryption key using the information specific to the specified entity, a private key of the specified entity, the second signature component and a value derived from the combination of the first signature component and the first portion of the message; and using the first decryption key to decrypt the second portion of the message from the first signature component.

In yet another aspect, there is provided a method of generating a signature on a message is provided, the method comprising: dividing a message into a plurality of portions, a first portion of the message being visible and a second portion of the message to be hidden and recoverable by any entity; encrypting the second portion of the message using a first encryption key to generate a first signature component; generating a second signature component using the first signature component, the first portion of the message and an element derived from a private key as inputs to an elliptic curve digital signature algorithm (ECDSA) signing equation; and preparing the signature comprising the first and second signature components and the first portion of the message.

In yet another aspect, there is provided a method of verifying a signature on a message is provided, the message comprising a plurality of portions, a first portion of the message being visible and a second portion of the message being hidden and recoverable by any entity; the method comprising: obtaining the signature having a first signature component encrypting the second portion of the message using a first encryption key, having a second component generated using the first signature component, the first portion of the message and an element derived from a private key as inputs to an ECDSA signing equation, and having the first portion of the message; computing a first decryption key using the first and second signature components, a public key of a signing entity and a value derived from a combination of the first signature component and the first portion of the message; using the first decryption key to decrypt the second portion of the message from the second signature component; and using the decrypted second portion of the message to verify the signature.

BRIEF DESCRIPTION OF THE DRAWINGS

Embodiments of the invention will now be described by way of example only with reference to the appended drawings wherein.

DETAILED DESCRIPTION OF THE DRAWINGS

It has been recognized that a portion of the signed message can be kept confidential in a cryptographic signature by dividing the message being signed into at least three parts, wherein one portion is visible or plaintext, another portion is hidden and recoverable by any entity having access to the signer's public key and carries a specific characteristic such as a certain amount of redundancy, for verification, and at least one additional portion is also hidden but only recoverable by a specific verifying entity having the necessary secret value (i.e. providing confidential message recovery). The additional portion is kept confidential by encrypting such portion using a key generated from information specific to that verifying entity. In this way, any entity with access to the signer's public key can verify the signature by checking the specified characteristic of the one recovered portion, but cannot recover the confidential portion, only the specific entity can do so, as the specific entity is the only one with the secret value needed to recover the confidential portion. The confidential message recovery can be implemented in elliptic curve fields or in other fields such as $Z_p$.

It has also been recognized that message recovery in an elliptic curve signature can be implemented using a modification of the well analyzed Elliptic Curve Digital Signature Algorithm (ECDSA) signing equation instead of, e.g. the Schnorr equation used in conventional PV signature schemes.

Figure 1:
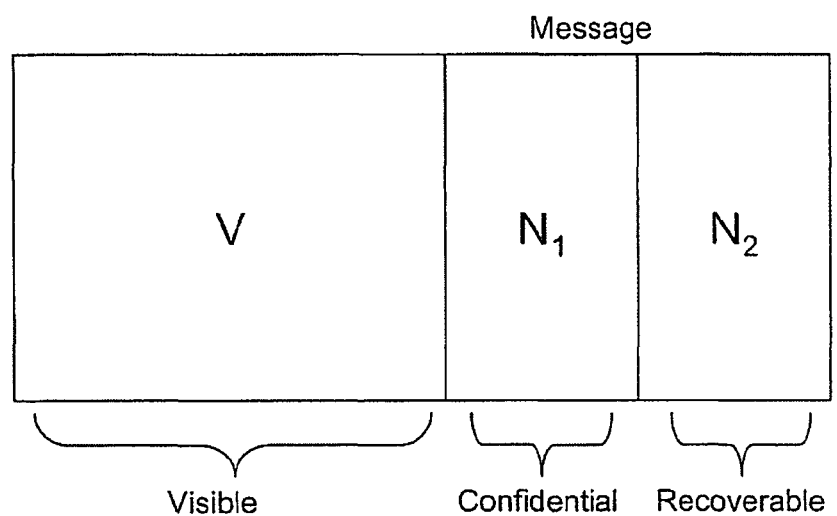
FIG. 1 is a schematic diagram of a message having visible, confidential, and recoverable portions.

Turning now to FIG. 1, a message 10 having a visible portion V, a confidential portion $N_1$ and a recoverable portion $N_2$ (having a certain amount of redundancy) is shown. It will be appreciated that the message 10 may include more than three parts.

Figure 2:
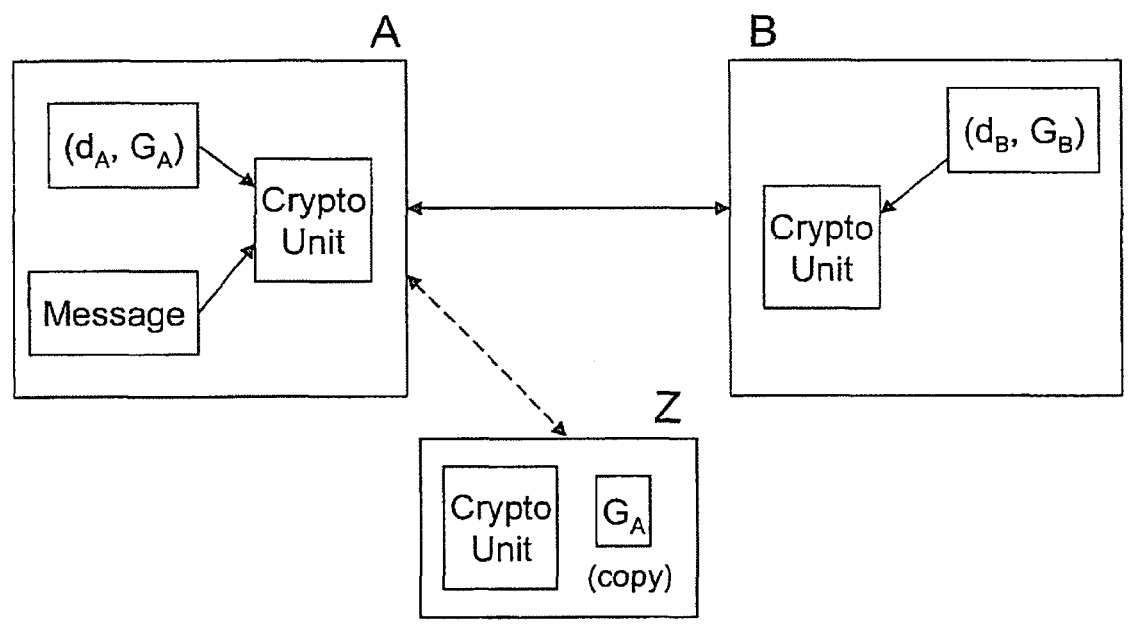
FIG. 2 is a schematic diagram of a cryptographic communication system.

FIG. 2 shows a cryptographic communication system 12 in which a signing entity A signs the message 10 using a cryptographic unit 14 and has a private/public ECPVS key pair $(d_A, G_A)$. The cryptographic unit 14 includes a cryptographic processor configured for executing computer readable instructions for performing cryptographic operations as discussed below. The cryptographic unit 14 may also include a computer readable medium comprising computer executable instructions for causing the cryptographic processor to perform such cryptographic operations. The entity A may communicate with a first verifying entity B over a communication channel 18, and may communicate with any other verifying entity Z over a communication channel 20, which may be the same as channel 18 or a different communication link. The entity B also has a cryptographic unit 22 and has a private/public ECPVS key pair $(d_B, G_B)$. It can also be seen in FIG. 2 that the entity Z has a cryptographic unit 24 which is at least capable of verifying signatures and obtaining a copy of entity A's public key $G_A$.

Figure 3:
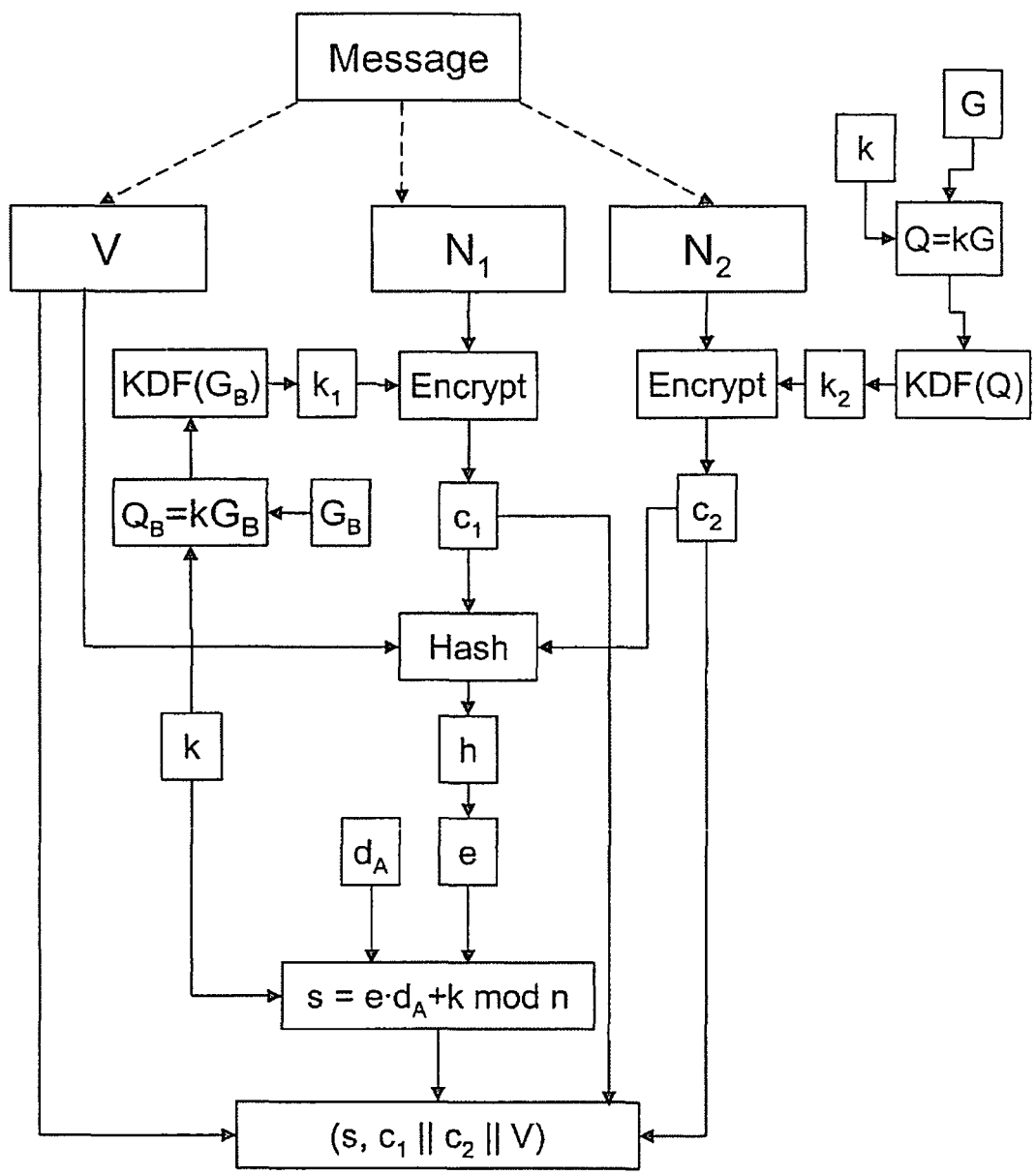
FIG. 3 is a block diagram illustrating construction of an ECPV signature with confidential message recovery.
Figure 4:
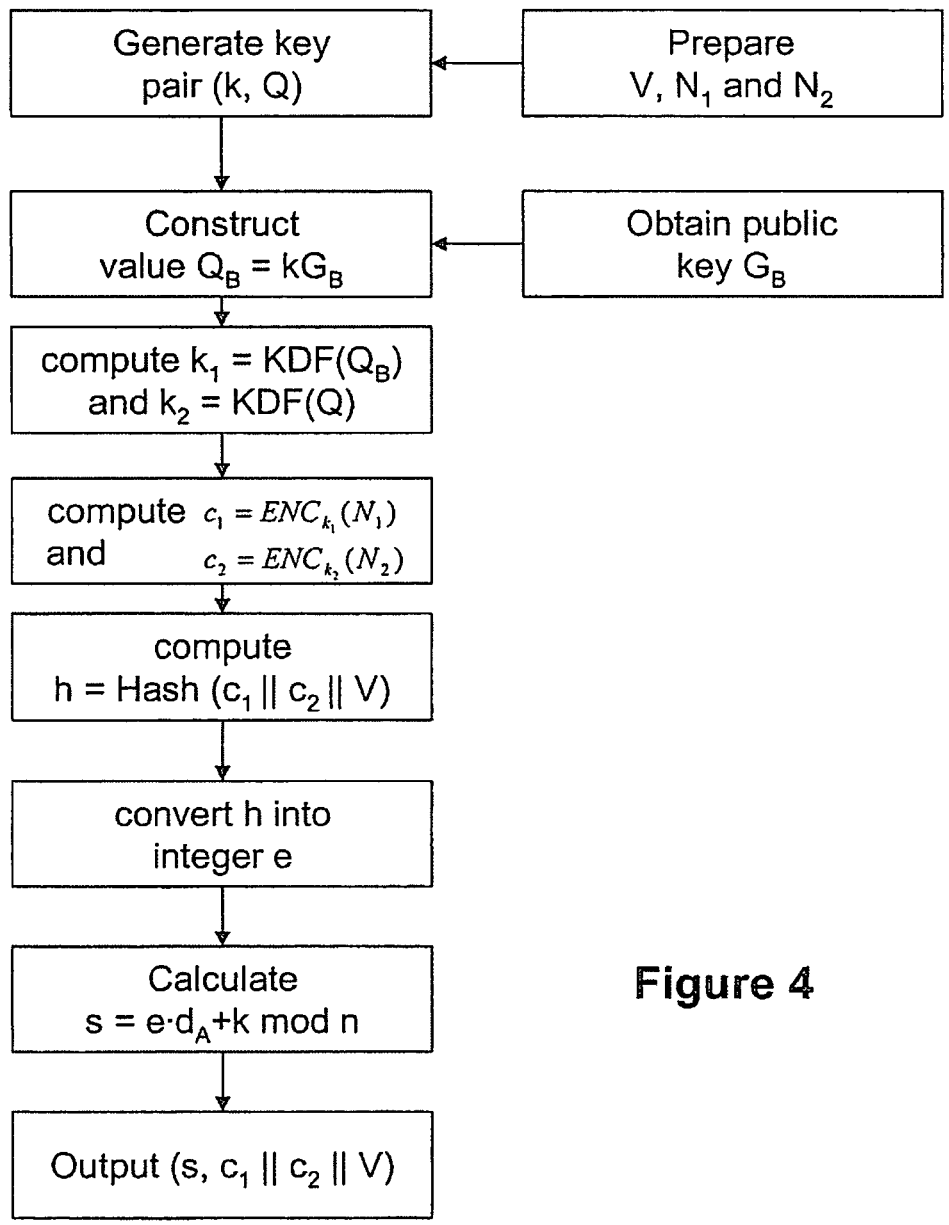
FIG. 4 is a flow chart illustrating steps in preparing a signature constructed according to the diagram of FIG. 3.

In one embodiment, the entity A signs the message 10 shown in FIG. 1 such that entity B is the legitimate recipient and thus can recover the confidential portion $N_1$ while entity B and any other entity Z can recover $N_2$ and verify the signature using such recovered data. The portion $N_2$ is given a certain characteristic, in the following, a certain amount of redundancy, such that by checking the redundancy of the recovered value, the signature can be verified. For example, $N_2$ could simply be a string of zeros of a certain length. FIGS. 3 and 4 illustrate the construction of a signature with confidential message recovery performed by entity A.

For signature generation, entity A uses its private key $d_A$, entity B's public key $G_B$, and signs the message 10, having plaintext V and portions $N_1$ and $N_2$, which will be encrypted. Entity A generates an ephemeral key pair (k, Q) and then using k and the public key $G_B$, constructs a value $Q_B=kG_B$. The value $Q_B$ is used to create an encryption key for encrypting the portion $N_1$ so that only entity B (or an entity having access to B's private key if applicable) can recover or unlock the confidential information contained in the portion $N_1$.

Two encryption keys are computed using a key derivation function: $k_1=KDF(Q_B)$ and $k_2=KDF(Q)$. Using the two encryption keys, the recoverable and confidential portions are then encrypted, using a suitable encryption scheme, to generate a pair of corresponding signature components: $c_1=ENC_{k_1}(N_1)$ and $c_2=ENC_{k_2}(N_2)$. The encryption scheme ENC takes as input plaintext $(N_1, N_2)$ and encrypts the plaintext using a secret key $(k_1, k_2)$ and produces ciphertext, $(c_1, c_2)$ which are used as signature components.

An intermediate value h is then computed by hashing a combination (e.g. concatenation) of the pair of signature components $c_1$ and $c_2$ and the visible portion V: $h=Hash(c_1\|c_2\|V)$. Hash is a suitable hash function, e.g. SHA1, that may also incorporate additional information such as identity information of A into h. The value h is then converted into an integer e to be used in computing another signature component s.

The signature component s, as is done in ECPVS, can be computed using a suitable signing equation such as the Schnorr equation: $s=e \cdot d_A+k \bmod n$. The resultant signature $(s, c_1\|c_2\|V)$ may then be output.

Figure 5:
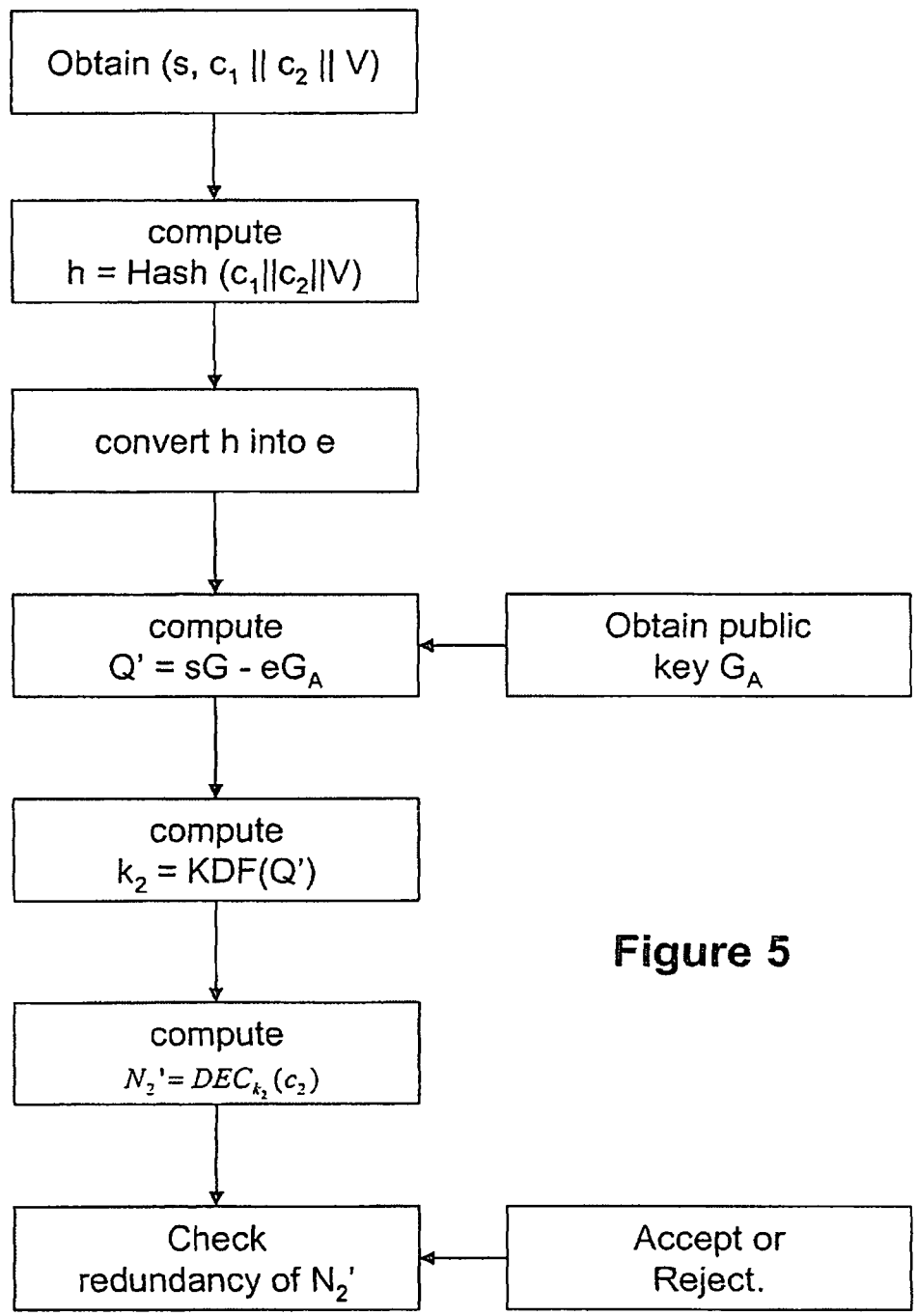
FIG. 5 is a flow chart illustrating verification of the signature prepared in FIG. 4 with partial message recovery.

As discussed above, the portion $N_2$ can be recovered by entity B or any other entity Z using the public key of the signer A. FIG. 5 illustrates a process of partial message recovery, which obtains a representation $N_2'$ of the portion of the message $N_2$ having redundancy so that the redundancy can be checked to verify the signature. For the purpose of this illustration, it will be assumed that the verifying entity in FIG. 5 is entity Z, which cannot recover $N_1$ because it does not possess the secret key $d_B$, and thus $N_1$ remains confidential with respect to entity Z.

As can be seen from FIG. 5, the entity Z obtains the signature $(s, c_1\|c_2\|V)$ and requires the public key $G_A$ of the signing entity A to verify the signature. The intermediate value h is first computed using the same hash function, Hash, and the combination $c_1\|c_2\|V$ and any additional information used in creating h. The value h is then converted into an integer e and a representation $Q'$ of the ephemeral key Q is then computed using also the signature component s, the public key $G_A$, and the point G as: $Q'=sG-eG_A$. Having computed $Q'$, entity Z then uses the same key derivation function KDF to obtain a decryption key $k_2'=KDF(Q')$. The decryption key $k_2'$ and the signature component $c_2$ are then used, with the complementary decryption function DEC, to recover $N_2'$ from $c_2$. Having recovered $N_2'$, entity Z then checks for the characteristic, e.g. a certain amount of redundancy, and accepts or rejects the signature on this basis. As such, if entity Z does not find the proper amount of redundancy, the signature is deemed to be invalid.

Figure 6:
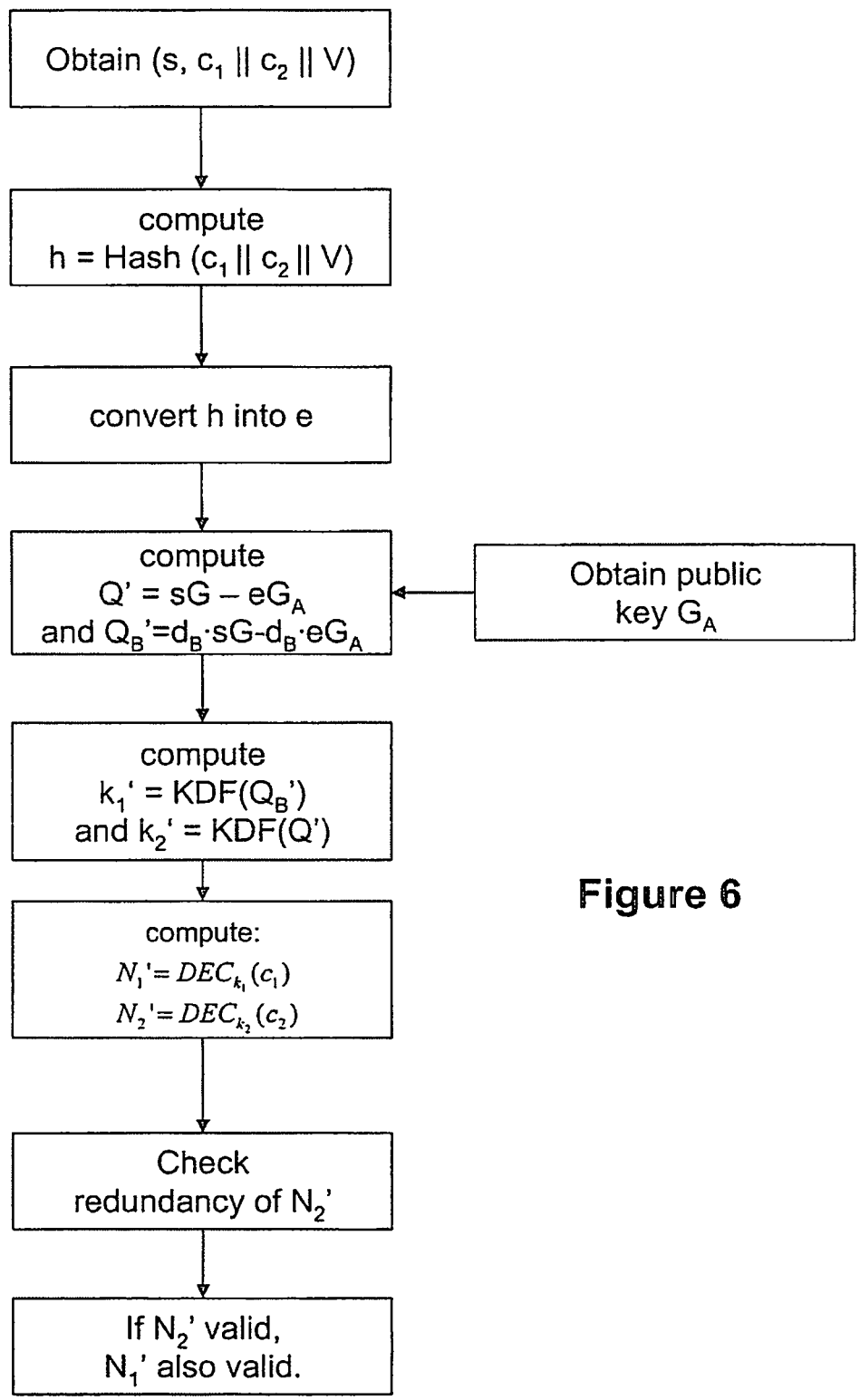
FIG. 6 is a flow chart illustrating verification of the signature prepared in FIG. 4 with confidential message recovery.

Turning now to FIG. 6, a process is shown for entity B to both verify the signature and recover the confidential portion $N_1$. As can be seen in FIG. 6, entity B obtains the signature $(s, c_1\|c_2\|V)$ and requires the public key $G_A$ of the signing entity A and its own private key $d_B$, to verify the signature. As above, the intermediate value h is first computed using the same hash function Hash and the combination $c_1\|c_2\|V$ and any additional information used when creating h. The value h is then converted into an integer e and a representation $Q'$ of the ephemeral key Q is then computed using the signature component s and the public key $G_A$ as: $Q'=sG-eG_A$. It may be recalled from above that the value $Q_B$ was computed using the public key of B, $G_B$. As such, entity B can compute a representation $Q_B'$ of the value $Q_B$ using its private key $d_B$, the signature component s, the integer e, the public key $G_A$, and the point G as: $Q_B'=d_B \cdot sG-d_B \cdot eG_A$. Having computed $Q'$ and $Q_B'$, entity B then uses the same key derivation function KDF to obtain decryption key $k_2'=KDF(Q')$ as above, and also to obtain decryption key $k_1'=KDF(Q_B')$. The decryption keys $k_1'$ and $k_2'$ and the signature components $c_1$ and $c_2$ are then used, with the complementary decryption function DEC, to recover $N_1'$ and $N_2'$ from $c_1$ and $c_2$ respectively. Having recovered $N_1'$ and $N_2'$, entity B then checks for the proper amount of redundancy in $N_2'$, and accepts or rejects both $N_1'$ and $N_2'$ on this basis, since if the redundancy in $N_2'$ is incorrect, the signature is invalid or has been compromised in some way.

It can therefore be seen that being able to specify a particular characteristic, which is then encrypted in the recoverable portion (e.g. $N_2$) in an ECPV signature enables one to check a predictable, recoverable output for verifying the signature. Also, using the public key of entity B to encrypt the confidential portion enables one to limit who/what can recover the confidential portion to a specific entity, in this example, entity B. It will be appreciated that the embodiment of FIGS. 3 to 6 can also be implemented using a plurality of portions, e.g. N and V only, wherein the hidden portion N is computed as $N_1$ in the above and is also used to verify the signature. As such, in general, the message is divided into a plurality of portions.

As noted above, it has also been recognized that basic message recovery (on a message having a pair of portions, N and V) as provided by traditional ECPVS can also be provided by having inputs into a modification of the well analyzed ECDSA signing equation, hereinafter referred to as Elliptic Curve Digital Signature with Recovery (ECDSR). Previous uses of the ECDSA signing equation have not been able to provide message recovery. In the following embodiment, confidential message recovery is also provided in an ECDSA implementation, using the same principles discussed above for PV signatures.

Figure 7:
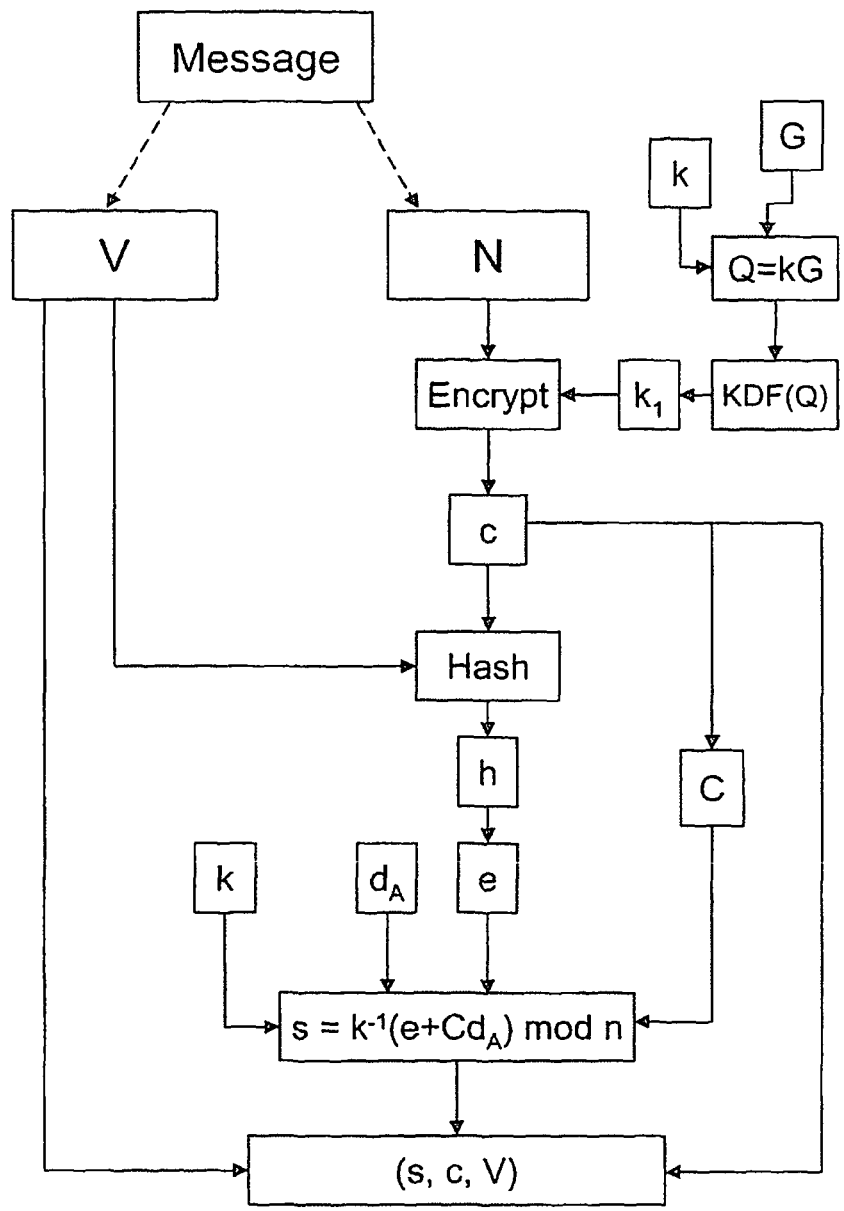
FIG. 7 is a block diagram illustrating construction of an Elliptic Curve Digital Signature with Recovery (ECDSR).
Figure 8:
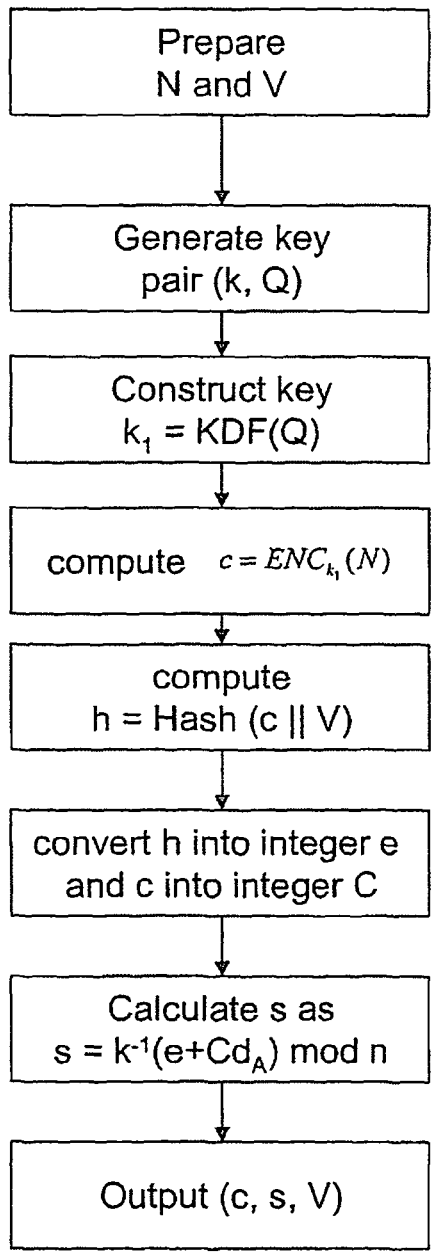
FIG. 8 is a flow chart illustrating steps in preparing a signature constructed according to the diagram of FIG. 7.

Turning now to FIGS. 7 and 8, the construction of an ECDSR is shown. As can be seen in FIG. 7, similar to traditional ECPV signatures, the message is divided into a visible portion V and a recoverable portion N. For signature generation, entity A uses its private key $d_A$, and signs the message 10, having plaintext V and recoverable portion N, which will be encrypted. Entity A generates an ephemeral key pair (k, Q) and using Q, constructs an encryption key $k_1$=KDF(Q), again using a suitable key derivation function. The encryption key $k_1$ is then used with a suitable encryption function ENC, to encrypt the portion N by computing a first signature component c=$ENC_{k_1}$(N).

An intermediate value h is then computed by hashing a combination (e.g. concatenation) of the signature component c and the visible portion V where: h=Hash(c∥V) and Hash is a suitable hash function that takes as an input additional information such as an identity string. The value h is then converted into an integer e, and the signature component c is converted to an integer C to be used in computing another signature component s.

The signature component s is computed using a modification of the ECDSA signing equation rather than using, e.g., the Schnorr equation, as sometimes used in ECPVS. In this way, is computed as: s=$k^{-1}$(e+C·$d_A$) mod n, where, e is the integer form of h, C is an integer derived from the signature component c that hides the portion N, and $d_A$ is the long term private key of entity A. The resultant signature (c, s, V) may then be output.

As noted above, a modified version of the ECDSA signing equation is used in this embodiment. It may be noted that in the ECDSA signing algorithm an ephemeral point kP is generated, and the integer value $\bar{x}_1$ is then derived from the x-coordinate of kP. That value is used to generate a signature component r, which is used in the signing equation to compute s=$k^{-1}$(e+dr), where e is the integer representation of the hashed message Hash(M), and d is the private key of the signer. The resulting signature is (r,s) for the message M. The verification computes point X=$es^{-1}$P+$rs^{-1}$Q, where Q is the public key of the signer and equal to dP. As s=$k^{-1}$(e+dr), then $s^{-1}$=k(e+dr)$^{-1}$. When the value $s^{-1}$ is substituted into the equation for X, the value X=$s^{-1}$eP+$s^{-1}$rdP=$s^{-1}$(e+dr)P=k(e+dr)$^{-1}$(e+dr)P=kP. Therefore, if $\bar{x}_1$' is computed from the x-coordinate of the value X, and a value v=$\bar{x}_1$' mod n is calculated, the signature can be validated if v=r. Any attempt to create a forged signature should result in a random point X being computed, and so the x-coordinate integer representation $\bar{x}_1$' and thus the value v, should be different. It can thus be seen that in the ECDSR embodiment, the recipient should recover the same original plaintext value N, from the signature verification routine, i.e. where N'=N, since the verifier computes R'=$es^{-1}$G+$cs^{-1}$$G_A$=$es^{-1}$G+$Cs^{-1}$$d_A$G=($es^{-1}$+$Cs^{-1}$$d_A$)G=$s^{-1}$(e+C$d_A$)G. However, in this embodiment, s=$k^{-1}$(e+C$d_A$), and thus substituting $s^{-1}$=k(e+C$d_A$)$^{-1}$, it can be seen that $s^{-1}$(e+C$d_A$)G=k(e+C$d_A$)$^{-1}$(e+C$d_A$) G=kG=R. As such, the verifier can compute the same key $k_1$=KDF(R) used to perform the encryption and then compute N'=$DEC_{k_1}$(c). Now, the security comes in the fact that any signed message (c, s, V) will be able to obtain a value N' and the verifier verifies that N' looks like (i.e. has the characteristic) that they expect. In one example, the verifier looks for a certain amount of redundancy. In this case, any attempt to forge a signature would effectively make N' look random, and so not have the expected redundancy. Advantages to using this signing equation include: 1) high assurance that this signing equation is secure; and 2) existing ECDSA implementations can be taken advantage of to perform some of the calculations.

Figure 9:
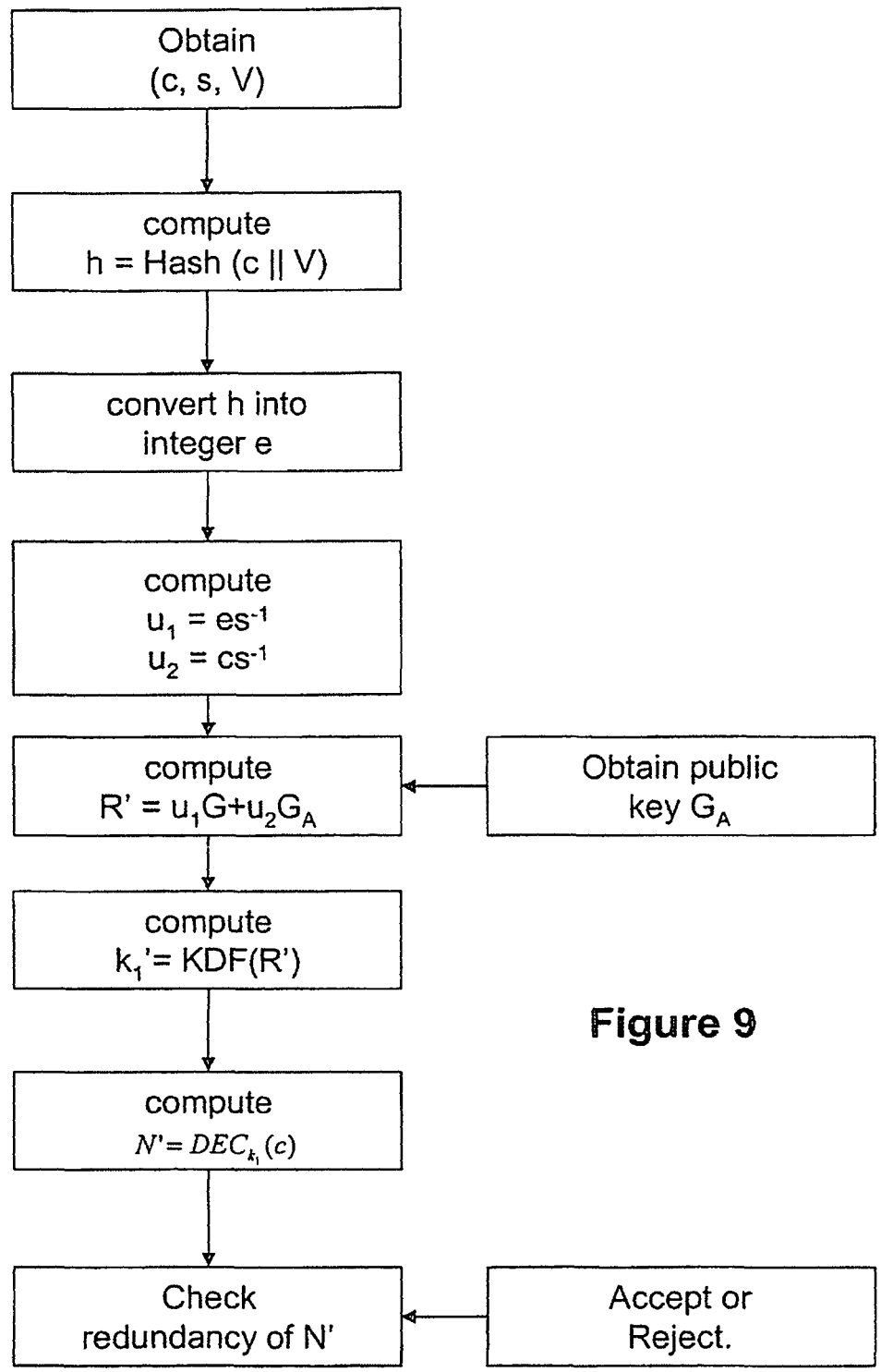
FIG. 9 is a flow chart illustrating verification of the signature prepared in FIG. 8.

Turning now to FIG. 9, verification of the signature (c, s, V) is shown, which can be done by any entity having access to the public key $G_A$ of the entity A. For the purpose of this illustration, it will be assumed that the verifying entity in FIG. 9 is entity Z.

As can be seen from FIG. 9, the entity Z obtains the signature (c, s, V) and requires the public key $G_A$ of the signing entity A to verify the signature. The intermediate value h is first computed using the same hash function Hash and the combination c∥V and any additional input information. The value h is then converted into an integer e. Since the ECDSA signing equation was used in FIG. 8, a pair of components $u_1$ and $u_2$ are then computed as: $u_1$=$es^{-1}$ and $u_2$=$cs^{-1}$; and such components are then used to compute a value R' using the public key $G_A$ as: R'=$u_1$G+$u_2$$G_A$. The value R' is then used, along with the same key derivation function KDF, to obtain a decryption key $k_1$'=KDF(R'). The decryption key $k_1$' is then used with the complimentary decryption function DEC to recover a representation N' from signature component c as: N'=$DEC_{k_1}$(c). The value N' is then checked for the specified characteristic, e.g. for a certain amount of redundancy, and the signature accepted or rejected on this basis. As such, in this example, if entity Z does not find the proper amount of redundancy, the signature is deemed to be invalid.

It will be appreciated that for the embodiment of FIGS. 7-9, the equation for generating s in the signature generation algorithm of FIGS. 7 and 8 can instead be: s=$k^{-1}$(C+e·$d_A$) mod n (i.e. C and e are interchanged), where the equation for generating R' would instead be: R'=$u_2$G+$u_1$$G_A$.

Figure 10:
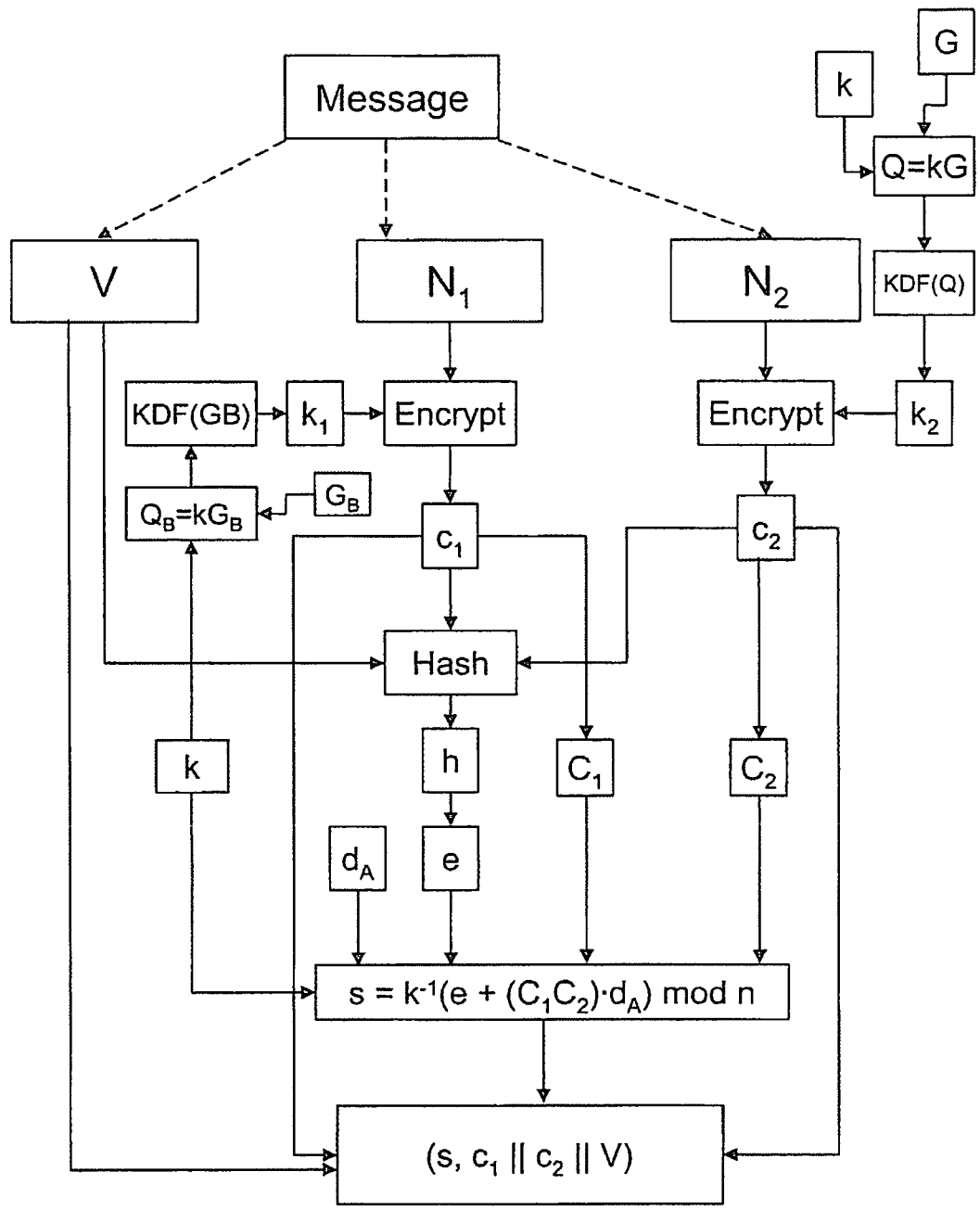
FIG. 10 is a block diagram illustrating construction of an ECDSR signature with confidential message recovery.
Figure 11:
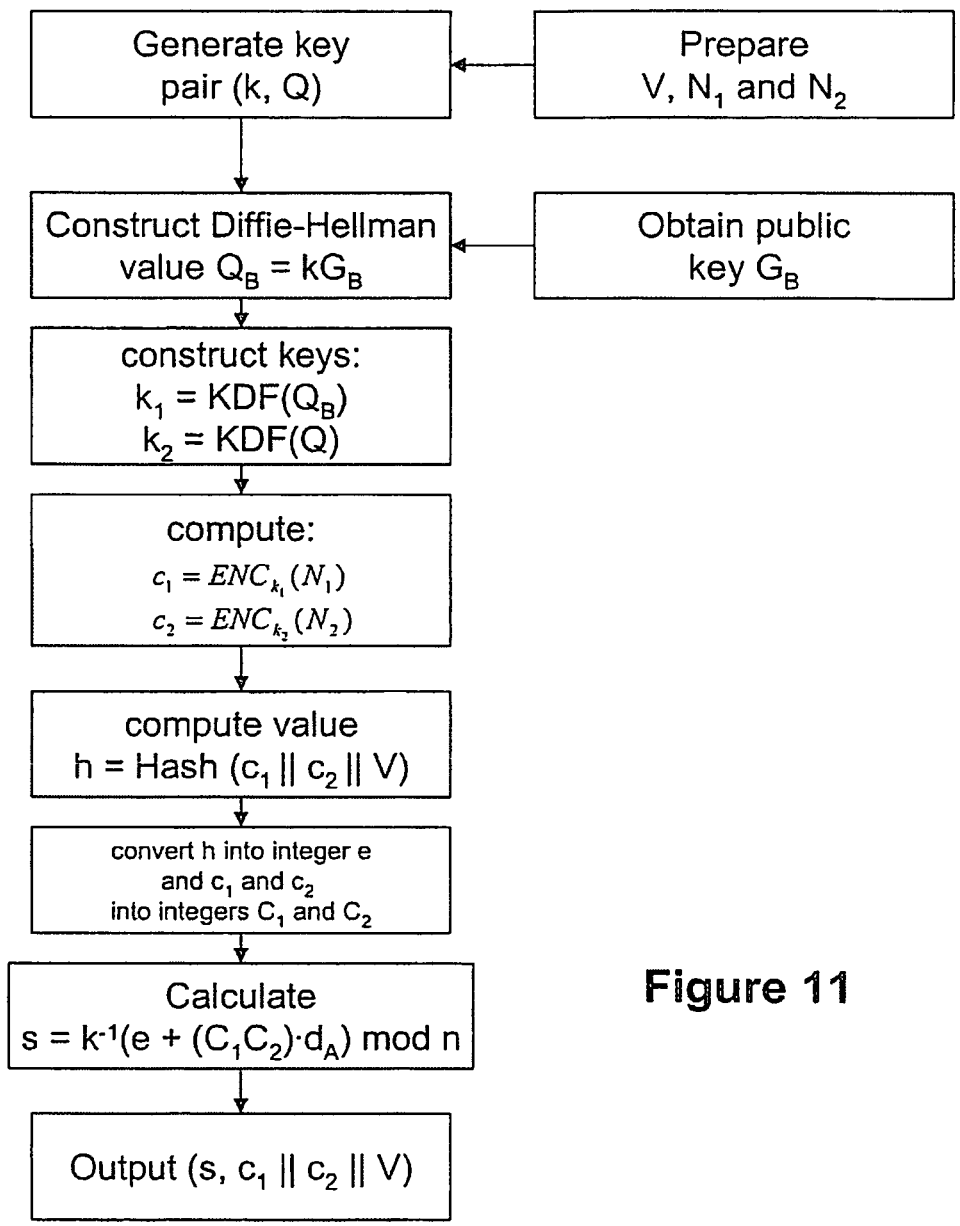
FIG. 11 is a flow chart illustrating steps in preparing a signature constructed according to the diagram of FIG. 10.

The ECDSR scheme discussed above can be extended to include confidential 9 message recovery as shown in FIGS. 10-13. Turning first to FIGS. 10 and 11, ECDSR signature generation with confidential message recovery is shown.

For signature generation, entity A uses its private key $d_A$, entity B's public key $G_B$, and, as above, signs the message 10, having plaintext V and portions $N_1$ and $N_2$, which will be encrypted. Entity A generates an ephemeral key pair (k, Q) and then using k and the public key $G_B$, constructs a value $Q_B$=$kG_B$. The value $Q_B$ is used to encrypt the portion $N_1$ so that only entity B (or an entity having access to B's private key if applicable) can recover or unlock the confidential information contained in the portion $N_1$.

Two encryption keys are then computed: $k_1$=KDF($Q_B$) and $k_2$=KDF(Q). Using the two encryption keys, the recoverable and confidential portions are then encrypted using a suitable encryption scheme to generate a pair of corresponding signature components: $c_1$=$ENC_{k_1}$($N_1$) and $c_2$=$ENC_{k_2}$($N_2$). The encryption scheme E takes as input plaintext and a secret key and produces ciphertext, which create the signature components.

An intermediate value h is then computed by hashing a combination (e.g. concatenation) of the pair of signature components $c_1$ and $c_2$ and the visible portion V where:

h=Hash($c_1\|c_2\|V$) and Hash is a suitable hash function that may also use additional information such as identification information of A, to create h. The value h is then converted into an integer e, and components $c_1$ and $c_2$ are converted to integers $C_1$ and $C_2$ respectively, to be used in computed another signature component s.

The signature component s in ECDSR with confidential message recovery uses the ECDSA signing equation with a combination of the integer representations $C_1$ and $C_2$ of the signature components $c_1$ and $c_2$ in place of the integer C as used above. In the embodiment of FIGS. 10 and 11, the signature component s is computed as: $s=k^{-1}(e+(C_1C_2) \cdot d_A)$ mod n. The resultant signature (s, $c_1\|c_2\|V$) may then be output. It may be noted that if there is concern with increasing the size due to, e.g. adding $N_2$, a compression algorithm could be applied to remove redundancy in a portion of the message.

Figure 12:
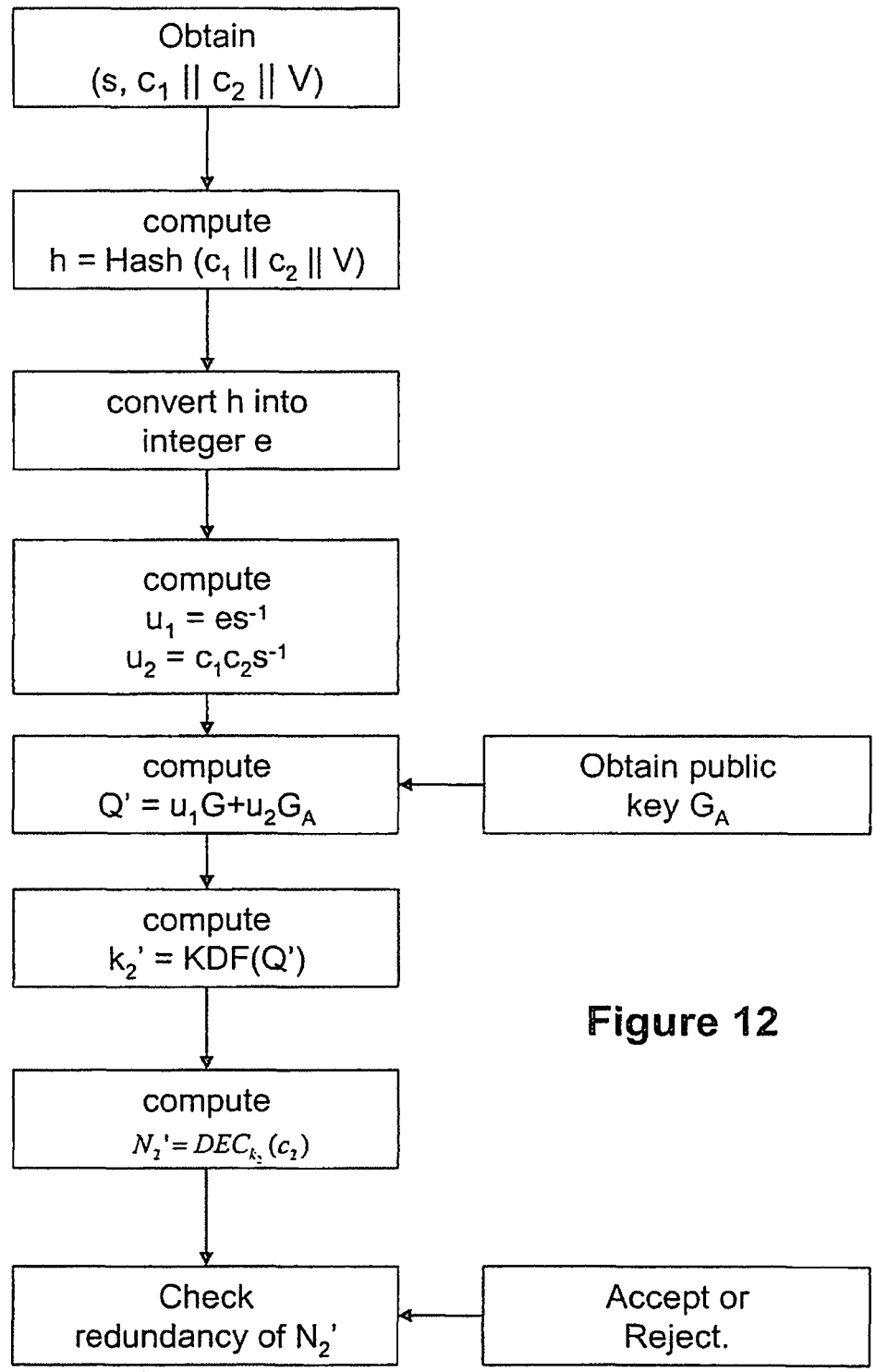
FIG. 12 is a flow chart illustrating verification of the signature prepared in FIG. 11 with partial message recovery.

Turning now to FIG. 12, ECDSR with partial message recovery is shown, which enables any entity to recover the recoverable portion $N_2$ when having access to the public $G_A$ of the signing entity A. As above, the specified characteristic, such as a certain amount of redundancy in the recovered value can be checked to verify the signature. For the purpose of this illustration, it will be assumed that the verifying entity in FIG. 12 is entity Z, which cannot recover $N_1$ and thus $N_1$ remains confidential. This is because the value N1 is encrypted using a value derived from the public key $G_B$ of entity B and thus can only be decrypted by having the private key $d_B$ of entity B.

As can be seen from FIG. 12, the entity Z obtains the signature (s, $c_1\|c_2\|V$) and requires the public key $G_A$ of the signing entity A to verify the signature. The intermediate value h is first computed using the same hash function Hash and the combination $c_1\|c_2\|V$ and any additional input information. The value h is then converted into an integer e. Since the ECDSA signing equation was used in FIG. 11, a pair of components $u_1$ and $u_2$ are then computed as: $u_1=es^{-1}$ and $u_2=c_1c_2s^{-1}$ (i.e. using $c_1c_2$ in place of c); and such components are then used to compute a value Q' using the public key $G_A$ as: $Q'=u_1G+u_2G_A$.

Having computed Q', entity Z then uses the same key derivation function KDF to obtain a decryption key $k_2'=KDF(Q')$. The decryption key $k_2'$ and the signature component $c_2$ are then used, with the complementary decryption function DEC, to recover $N_2'$ from $c_2$. Having recovered $N_2'$, entity Z then checks for the characteristic, e.g. a certain amount of redundancy and accepts or rejects the signature on this basis. As such, in this example, if entity Z does not find the proper amount of redundancy, the signature is deemed to be invalid.

Figure 13:
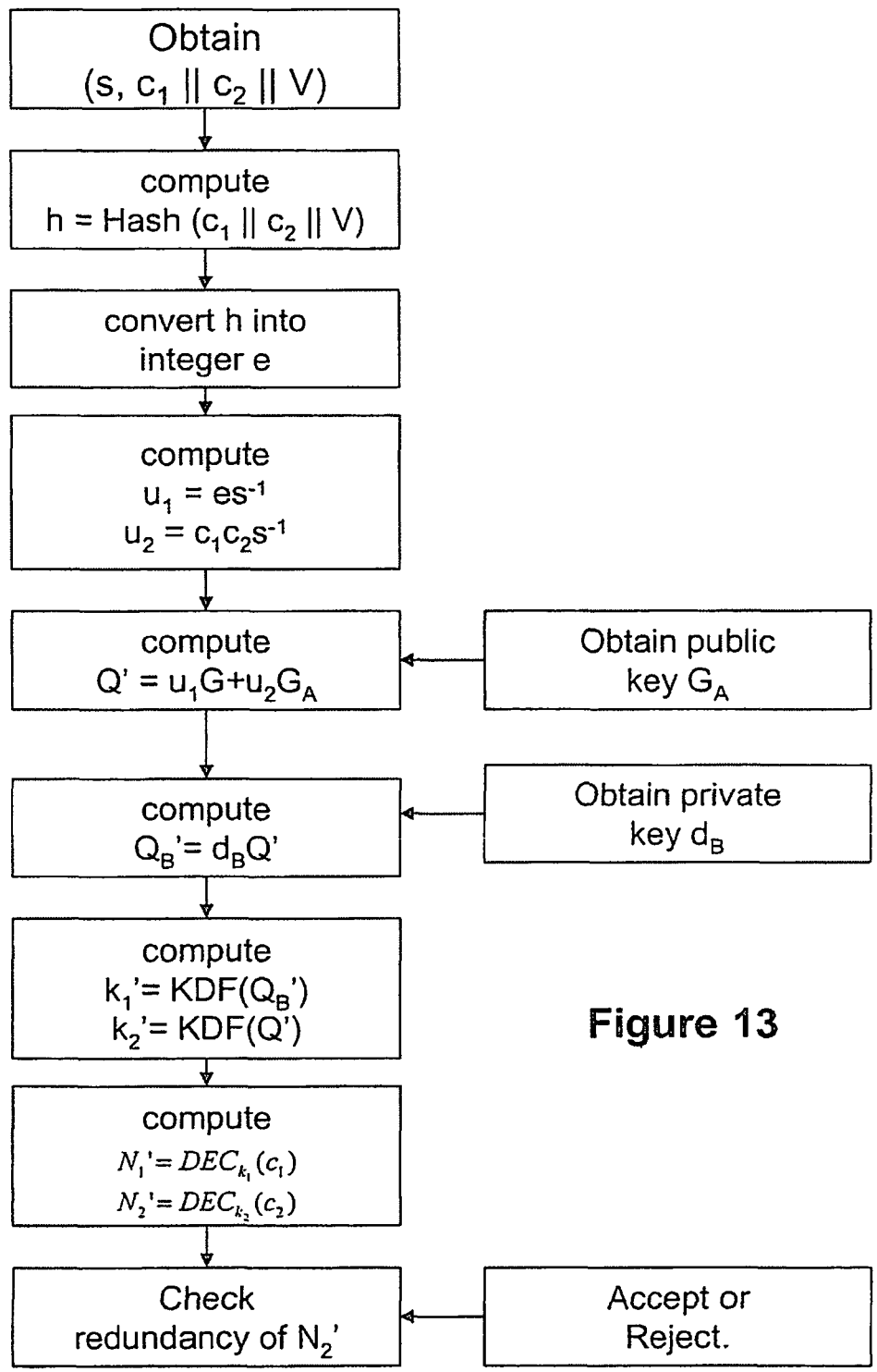
FIG. 13 is a flow chart illustrating verification of the signature prepared in FIG. 11 with confidential message recovery.

Turning now to FIG. 13, a process is shown for entity B to both verify the signature and recover the confidential portion. As can be seen in FIG. 13, entity B obtains the signature (s, $c_1\|c_2\|V$) and requires the public key $G_A$ of the signing entity A and its own private key $d_B$, to verify the signature. As above, the intermediate value h is first computed using the same hash function Hash and the combination $c_1\|c_2\|V$ and any additional input information. The value h is then converted into an integer e and a representation Q' of the ephemeral key Q is then computed by first generating the values $u_1$ and $u_2$ and using the public key $G_A$ as shown in FIG. 12 and discussed in greater detail above.

In order to recover the confidential portion $N_1$, entity B also computes a representation $Q_B'$ using the value Q' and its private key $d_B$, namely as: $Q_B'=d_BQ'$. Having computed $Q_B'$ and Q', entity B then computes decryption keys $k_1'$ and $k_2'$ respectively, using the same key derivation function KDF, namely as: $k_1'=KDF(Q_B')$ and $k_2'=KDF(Q')$.

The decryption keys $k_1'$ and $k_2'$ and the signature components $c_1$ and $c_2$ are then used, with the complementary decryption function DEC, to recover $N_1'$ and $N_2'$ from $c_1$ and $c_2$ respectively. Having recovered $N_1'$ and $N_2'$, entity B then checks for the proper amount of redundancy in $N_2'$, and accepts or rejects both $N_1'$ and $N_2'$ on this basis, since if the redundancy in $N_2'$ is incorrect, the signature is invalid or has been compromised in some way.

It can therefore be seen that an ECDSR signature as discussed above can be used to provide both message recovery for verification, and confidential message recovery by enabling one to check a predictable output to verify the signature and using the public key of entity B to encrypt the confidential portion, which enables one to limit who can recover the confidential portion to a specific entity, in this example, entity B.

It will be appreciated that although the above examples are implemented in elliptic curve fields, the same principles may be applied to schemes in other fields such as $Z_p$.

For example, a discrete log implementation using El Gamal can be utilized. In such an implementation, the inputs are entity A's private key $d_A$; a public key ($G_A$, g, p), where $G_A=g^{d_A}$ (mod p), g being the generator and p being the group order; a message m; and entity B's public key $G_B$. The signature generation proceeds as follows:

(a) Generate ephemeral public key pair k, $r=g^k$ (mod p).
(b) Derive encryption key: key=KDF($G^k_B$ (mod p)).
(c) Encrypt message: $c=ENC_{key}(m)$.
(d) Compute $s=(Hash(c)-d_Ar)k^{-1}$ (mod p-1).
(e) Output c, (r,s).

The analogous signature verification algorithm, with a decryption routine for entity B outlined in steps (c) and (d) is as follows.

(a) Verify 0<r<p and 0<s<p-1 or return INVALID.
(b) Verify $g^{Hash(c)}=G^r_A r^s$ (mod p), or return INVALID.
(c) If B is performing verification, generate key=KDF($r^{d_B}$ (mod p)), and decrypt $m=DEC_{key}(c)$.
(d) Return VALID and B obtains the message m.

The above El Gamal implementation can be of particular use in the application of Certificate Authority issuing a secret in a certificate, which the rightful owner could use for actions such as key-updating, certificate revocation, account management, or other key sharing applications.

It can be seen that the principles described above for providing message recovery (including confidential message recovery) can be extended to non-ECC implementations.

When implementing the above embodiments, there are several other extensions and/or variations that can be employed. One extension is that the ECDSR scheme can be performed when N is an empty string. In this case, more of the existing ECDSA signing operations can be used.

Another extension is that the ECDSR scheme discussed above can be applied to a discrete log implementation using a modified DSA signature scheme.

It has also been recognized that the segmentation of the recoverable message can be extended to multiple directed messages. For example, if there are t receivers $B_i$ with keys ($d_{B_i}$, $G_{B_i}$), then entity A can send a signature on the message $N_1\|N_2\| \ldots \|N_t\|N_{t+1}\|V$ where, as above, $N_{t+1}$ carries the necessary redundancy and $c_i=ENC_{k_i}(N_i)$ where $k_i=KDF(k \cdot G_{B_i})$.

A Shamir sharing scheme can also be used to generate a t-threshold secret S, where t or more recipients with their respective portions are required to come together in order to reconstruct the secret S. In this implementation, each $B_i$ is assigned a portion $d_i$ for the secret S, which can be used as a private key. The signer then encrypts the message $N_1$ with the key $k_1=KDF(k\cdot(SG))$, where S is the shared secret in a Shamir sharing scheme. When verifying the signature, the t recipients combine their portions $d_i$ to create S for computing the decryption key $k_1'$.

Yet another extension allows a signed message to be verified by anyone, but requires all participants to be present, using a trusted system, to decrypt the message $N_1$. This can be done by having the signing entity A create a key $k_1=KDF(k\cdot\Sigma_{i=1}^{2} G_{B_i})$, and encrypting the message by creating component $c_1$ as: $c_1=ENC_{k_1}(N_1)$. Verification of the signature would proceed as discussed above, with $Q_B'=(\Sigma_{i=1}^{t} d_{B_i})(sG-G_A)$.

Yet another extension has the key agreement scheme for the private entity (e.g. entity B) be based on another scheme, such as using one-pass MQV. In this extension, the signing entity A generates a shared secret $z=MQV(d_A, k, G_A, G_B)$, and then uses z in a key derivation function $k_1=KDF(z)$, along with additional information. On the verification side, there would be no change as to what occurs for verifiers other than entity B. Entity B however computes the analogous shared secret $z=MQV(d_B, d_B, G_A, Q')$, where Q' is the same as that computed in FIG. 6.

Additionally, the type of Diffie-Hellman (DH) key exchange in FIG. 11 can be done with regular ECDSA signatures. In this case, the ephemeral signing key is used with the public key of the recipient. In this way, a confidentiality key can be created as: $key=KDF(kG_B)$, and the message encrypted as $c=ENC(N, key)$. A traditional ECDSA signature is then computed on c, giving an (s,r) signature component pair. Anyone with entity A's public key $G_A$, can verify the signature (s,r) on c but only B can decrypt it.

A combination of any of the schemes discussed above, with any other one-pass exchange like one-pass MQV could also be implemented.

It can therefore be seen that a portion of the signed message can be kept confidential in an elliptic curve signature by dividing the message being signed into at least three parts, wherein one portion is visible or plaintext, another portion is hidden and recoverable by any entity having access to the signer's public key and carries the necessary redundancy for verification, and at least one additional portion is also hidden but only recoverable by a specific verifying entity having the necessary secret value (i.e. a confidential message recovery). The additional portion is kept confidential by encrypting such portion using a key generated from information specific to that verifying entity. In this way, any entity with access to the signer's public key can verify the signature by checking the redundancy of the one recovered portion, but cannot recover the confidential portion, only the specific entity can do so. It will be appreciated that the embodiment of FIGS. 3 to 6 can also be implemented using a plurality of portions, e.g. N and V only, wherein the hidden portion N is computed as $N_1$ in the above and is also used to verify the signature. As such, in general, the message is divided into a plurality of portions.

It can also be seen that message recovery in an elliptic curve signature can be implemented using a modification of the well analyzed ECDSA signing equation instead of, e.g. the Schnorr equation sometimes used in PV signature schemes.

Although the invention has been described with reference to certain specific embodiments, various modifications thereof will be apparent to those skilled in the art without departing from the spirit and scope of the invention as outlined in the claims appended hereto.

The invention claimed is:

1. A method for generating a signature of a message in a cryptographic communication system, said method comprising:
   a cryptographic processor of a first entity in said cryptographic communication system dividing a message into a plurality of portions, a first portion of said message to be visible, a second portion of said message to be hidden and confidential, and a third portion of said message to be hidden and recoverable, said second portion recoverable only by one or more verifying entities possessing a private key specific to said one or more verifying entities, the private key having a corresponding public key available to said first entity, said corresponding public key being specific to the verifying entity, said third portion being recoverable by any entity having access to a public key of said first entity, wherein each of said first entity and said one or more verifying entities are separate information processing systems communicatively coupled to each other via at least one communication link;
   said cryptographic processor generating an ephemeral key pair;
   said cryptographic processor constructing a secret value using said ephemeral key pair and public keys of a plurality of verifying entities;
   said cryptographic processor generating a first encryption key using said secret value such that presence of said plurality of verifying entities is required to provide corresponding private keys possessed by respective ones of said verifying entities to generate a corresponding decryption key;
   said cryptographic processor encrypting said second portion of said message using said first encryption key to generate a first signature component, said decryption key being required to decrypt said second portion of said message from said first signature component;
   said cryptographic processor generating a second signature component by combining said first signature component, said first portion of said message and a private key of said first entity using a signing equation;
   said cryptographic processor generating a third signature component by generating a second encryption key and encrypting said third portion of said message using said second encryption key;
   said cryptographic processor preparing the signature comprising said first, second, and third signature components and said first portion of said message; and
   sending said message and said signature to at least said one or more verifying entities.

2. The method according to claim 1, wherein said message comprises a plurality of additional portions to be hidden and confidential such that respective ones of said plurality of verifying entities can recover corresponding ones of said plurality of additional portions to be hidden, each of said plurality of additional portions to be hidden being encrypted using respective encryption keys, each of said respective encryption keys being generated using respective public keys associated with corresponding private keys possessed by respective ones of said plurality of verifying entities.

3. The method according to claim 1 wherein said second encryption key is generated such that said third portion can be recovered using said public key of said first entity.

4. The method according to claim 1 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

5. The method according to claim 1 wherein said signature is a discrete log signature.

6. An entity for generating a signature of a message in a cryptographic communication system, said entity comprising:
- a central processing unit;
- a memory; and a cryptographic processor coupled to said memory and said central processing unit, wherein said cryptographic processor is to:
- divide a message into a plurality of portions, a first portion of said message to be visible, a second portion of said message to be hidden and confidential, and a third portion of said message to be hidden and recoverable, said second portion recoverable only by one or more verifying entities possessing a private key specific to said one or more verifying entities, the private key having a corresponding public key available to said entity, the corresponding public key being specific to said verifying entity, said third portion being recoverable by any entity having access to a public key of said entity, wherein each of said entity and said one or more verifying entities are separate information processing systems communicatively coupled to each other via at least one communication link;
- generate an ephemeral key pair;
- construct a secret value using said ephemeral key pair and public keys of a plurality of verifying entities;
- generate a first encryption key using said secret value such that presence of said plurality of verifying entities is required to provide corresponding private keys possessed by respective ones of said verifying entities to generate a corresponding decryption key;
- encrypt said second portion of said message using said first encryption key to generate a first signature component, said decryption key being required to decrypt said second portion of said message from said first signature component;
- generate a second signature component by combining said first signature component, said first portion of said message and a private key of said entity using a signing equation;
- generate a third signature component by generating a second encryption key and encrypting said third portion of said message using said second encryption key;
- prepare the signature comprising said first, second, and third signature components and said first portion of said message: and
- sending said message and said signature to at least said one or more verifying entities.

7. The entity according to claim 6, wherein said first encryption key is generated using public keys of a plurality of verifying entities such that the presence of said plurality of verifying entities is required to provide corresponding private keys possessed by respective ones of said verifying entities to enable recovery of said second portion during verification of said signature.

8. The entity according to claim 6, wherein said second encryption key is generated such that said third portion can be recovered using said public key of said entity.

9. The entity according to claim 6 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

10. The entity according to claim 6 wherein said signature is a discrete log signature.

11. A non-transitory computer readable medium comprising computer executable instructions for causing a cryptographic processor of a first entity to generate a signature of a message in a cryptographic communication system, said computer executable instructions comprising instructions for:
- dividing a message into a plurality of portions, a first portion of said message to be visible, a second portion of said message to be hidden and confidential, and a third portion of said message to be hidden and recoverable, said second portion recoverable only by one or more verifying entities possessing a private key specific to said one or more verifying entities, the private key having a corresponding public key available to said first entity, said corresponding public key being specific to the verifying entity, said third portion being recoverable by any entity having access to a public key of said first entity, wherein each of said first entity and said one or more verifying entities are separate information processing systems communicatively coupled to each other via at least one communication link;
- generating an ephemeral key pair;
- constructing a secret value using said ephemeral key pair and public keys of a plurality of verifying entities;
- generating a first encryption key using secret value such that presence of said plurality of verifying entities is required to provide corresponding private keys possessed by respective ones of said verifying entities to generate a corresponding decryption key;
- encrypting said second portion of said message using said first encryption key to generate a first signature component, said decryption key being required to decrypt said second portion of said message from said first signature component;
- generating a second signature component by combining said first signature component, said first portion of said message and a private key of said first entity using a signing equation;
- generating a third signature component by generating a second encryption key and encrypting said third portion of said message using said second encryption key;
- preparing the signature comprising said first, second, and third signature components and said first portion of said message; and
- sending said message and said signature to at least said one or more verifying entities.

12. The non-transitory computer readable medium according to claim 11, wherein said message comprises a plurality of additional portions to be hidden and confidential such that respective ones of said plurality of verifying entities can recover corresponding ones of said plurality of additional portions to be hidden, each of said plurality of additional portions to be hidden being encrypted using respective encryption keys, each of said respective encryption keys being generated using respective public keys associated with corresponding private keys possessed by respective ones of said plurality of verifying entities.

13. The non-transitory computer readable medium according to claim 11 wherein said second encryption key is generated such that said third portion can be recovered using said public key of said first entity.

14. The non-transitory computer readable medium according to claim 11 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

15. The non-transitory computer readable medium according to claim 11 wherein said signature is a discrete log signature.

16. A method, with a second entity, of verifying a signature of a message from a first entity in a cryptographic communication system, said message comprising a plurality of portions, a first portion of said message being visible, a second portion of said message hidden and confidential, and a third portion of said message hidden and recoverable said second portion requiring a plurality private keys possessed by and specific to a plurality of entities to be recovered, each of said plurality of private keys having a corresponding public key available to said first entity, each of said corresponding public keys being specific to a respective one of said plurality of entities, where said third portion being recoverable by any entity having access to a public key of said first entity, said method comprising:

a cryptographic processor of said second entity in said cryptographic system obtaining said signature from said first entity over a communication link established with said first entity, wherein each of said first entity and said second entity are separate information processing systems, said signature having a first signature component encrypting said second portion of said message using a first encryption key, said first encryption key having been generated using public keys of said plurality of entities, said signature having a second signature component generated by combining said first signature component, said first portion of said message and a private key of said first entity using a signing equation, said signature comprising a third signature component generated by encrypting said third portion of said message using a second encryption key, and said signature including said first portion of said message;

said second entity generating a first decryption key using a public key of said first entity, said public keys of said plurality of entities, said second signature component and a value derived from the combination of said first signature component and said first portion of said message;

said second entity using said first decryption key to decrypt said second portion of said message from said first signature component;

said second entity computing a second decryption key using said second signature component, a public key of said first entity, and a value derived from said first signature component and said first portion of said message;

said second entity using said second decryption key to decrypt said third portion of said message from said third signature component; and said second entity verifying said signature using said third portion once recovered.

17. The method according to claim 16, further comprising processing said second portion of said message.

18. The method according to claim 16, wherein said message comprises a plurality of additional portions being hidden and confidential such that respective ones of said plurality of entities can recover corresponding ones of said plurality of additional portions being hidden and confidential, each of said plurality of additional portions having been encrypted using respective encryption keys, each of said respective encryption keys being generated using respective public keys associated with corresponding private keys possessed by respective ones of said plurality entities, said method further comprising recovering a plurality of said additional portions being hidden and confidential.

19. The method according to claim 16, further comprising obtaining and combining said public keys of said plurality of entities to generate said first encryption key.

20. The method according to claim 16 further comprising checking said third portion for a predetermined characteristic.

21. The method according to claim 20 wherein said predetermined characteristic is redundancy in said third portion.

22. The method according to claim 16 wherein said second encryption key is generated such that said third portion is recovered using said public key of said first entity.

23. The method according to claim 16 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

24. The method according to claim 16 wherein said signature is a discrete log signature.

25. A second entity for verifying a signature of a message from a first entity in a cryptographic communication system, said message comprising a plurality of portions, a first portion of said message being visible, a second portion of said message hidden and confidential, and a third portion of said message hidden and recoverable, said second portion requiring a plurality private keys possessed by and specific to a plurality of entities to be recovered, each of said plurality of private keys having a corresponding public key available to said first entity, each of said corresponding public keys being specific to a respective one of said plurality of entities, where said third portion being recoverable by any entity having access to a public key of said first entity, said second entity comprising:

a central processing unit;
a memory; and
a cryptographic processor coupled to said memory and said central processing unit, wherein said cryptographic processor is to:
obtain said signature from said first entity over a communication link established with said first entity, wherein each of said first entity and said second entity are separate information processing systems, said signature having a first signature component encrypting said second portion of said message using a first encryption key, said first encryption key having been generated using public keys of said plurality of entities, said signature having a second signature component generated by combining said first signature component, said first portion of said message and a private key of said first entity using a signing equation, said signature comprising a third signature component generated by encrypting said third portion of said message using a second encryption key, and said signature including said first portion of said message, wherein each of said first entity and said second entity are separate information processing systems communicatively coupled to each other via the communication link;
generating a first decryption key using a public key of said first entity, said public keys of said plurality of entities, said second signature component and a value derived from the combination of said first signature component and said first portion of said message;

using said first decryption key to decrypt said second portion of said message from said first signature component;

computing a second decryption key using said second signature component, a public key of said first entity, and a value derived from said first signature component and said first portion of said message;

using said second decryption key to decrypt said third portion of said message from said third signature component; and verifying said signature using said third portion once recovered.

26. The second entity according to claim 25, further comprising processing said second portion of said message.

27. The second entity according to claim 25, wherein said computer readable instructions further comprise instructions for recovering each of said second and third portions of the message being hidden and confidential.

28. The second entity according to claim 25, wherein said first encryption key has been generated by combining said public keys of said plurality of entities.

29. The second entity according to claim 25 further comprising checking said third portion for a predetermined characteristic.

30. The second entity according to claim 29 wherein said predetermined characteristic is redundancy in said third portion.

31. The second entity according to claim 25 wherein said second encryption key is generated such that said third portion is recovered using said public key of said first entity.

32. The second entity according to claim 25 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

33. The second entity according to claim 25 wherein said signature is a discrete log signature.

34. A non-transitory computer readable medium comprising computer executable instructions for causing a cryptographic processor of a second entity to verify a signature of a message from a first entity in a cryptographic communication system, said message comprising a plurality of portions, a first portion of said message being visible, a second portion of said message hidden and, and a third portion of said message hidden and recoverable, said second portion requiring a plurality of private keys possessed by and specific to a plurality of entities to be recovered, each of said plurality of private keys having a corresponding public key available to said first entity, each of said corresponding public key being specific to a respective one of said plurality of entities, where said third portion being recoverable by any entity having access to a public key of said first entity, said computer readable instructions comprising instructions for:

obtaining said signature from said first entity over a communication link established with said first entity, wherein each of said first entity and said second entity are separate information processing systems, said signature having a first signature component encrypting said second portion of said message using a first encryption key, said first encryption key having been generated using public keys of said plurality of entities, said signature having a second signature component generated by combining said first signature component, said first portion of said message and a private key of said first entity using a signing equation, said signature comprising a third signature component generated by encrypting said third portion of said message using a second encryption key, and said signature including said first portion of said message;

generating a first decryption key using a public key of said first entity, said public keys of said plurality of entities, said second signature component and a value derived from the combination of said first signature component and said first portion of said message;

using said first decryption key to decrypt said second portion of said message from said first signature component;

computing a second decryption key using said second signature component, a public key of said first entity, and a value derived from said first signature component and said first portion of said message;

using said second decryption key to decrypt said third portion of said message from said third signature component; and verifying said signature using said third portion once recovered.

35. The non-transitory computer readable medium according to claim 34, further comprising processing said second portion of said message.

36. The non-transitory computer readable medium according to claim 34, wherein said message comprises a plurality of additional portions being hidden and confidential such that respective ones of said plurality of entities can recover corresponding ones of said plurality of additional portions being hidden and confidential, each of said plurality of portions having been encrypted using respective encryption keys, each of said respective encryption keys being generated using respective public keys associated with corresponding private keys possessed by respective ones of said plurality of verifying entities, said method computer readable instructions further comprising instructions for recovering a plurality of said additional portions being hidden and confidential.

37. The non-transitory computer readable medium according to claim 34, wherein said first encryption key has been generated by combining said public keys of said plurality of entities.

38. The non-transitory computer readable medium according to claim 34 further comprising checking said third portion for a predetermined characteristic.

39. The non-transitory computer readable medium according to claim 38 wherein said predetermined characteristic is redundancy in said third portion.

40. The non-transitory computer readable medium according to claim 34 wherein said second encryption key is generated such that said third portion is recovered using said public key of said first entity.

41. The non-transitory computer readable medium according to claim 34 wherein said signature is an elliptic curve signature and said second signature component is generated using either an Elliptic Curve Pintsov-Vanstone Signature (ECPVS) or an Elliptic Curve Digital Signing Algorithm (ECDSA) signature scheme.

42. The non-transitory computer readable medium according to claim 34 wherein said signature is a discrete log signature.

* * * * *

UNITED STATES PATENT AND TRADEMARK OFFICE
CERTIFICATE OF CORRECTION

Page 1 of 1

PATENT NO. : 9,455,832 B2
APPLICATION NO. : 12/230799
DATED : September 27, 2016
INVENTOR(S) : Daniel R. Brown et al.

It is certified that error appears in the above-identified patent and that said Letters Patent is hereby corrected as shown below:

In the Claims

In Column 18, Line 37, delete "verifying" and "method"

Signed and Sealed this
Third Day of January, 2017

Michelle K. Lee
*Director of the United States Patent and Trademark Office*